DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 6, 1974

925 O.G. 10

T925,008

POLYESTER-CELLULOSE ESTER POWDER COATING COMPOSITIONS

Robert C. Harrington, Jr., 2024 Canterbury Road, Kingsport, Tenn. 37660; James D. Hood, Rte. 2, Carroll Court, Blountville, Tenn. 37617; and Peter M. Grant, Rte. 12, Hemlock Park, Kingsport, Tenn. 37663

Continuation of abandoned application Ser. No. 296,711, Oct. 11, 1972. This application Jan. 9, 1974, Ser. No. 432,018

Int. Cl. C08b *21/08;* C08g *39/10*

U.S. Cl. 260—16

No Drawing. 6 Pages Specification

A powder coating composition which may be coated by techniques such as fluidized bed, electrostatic fluidized bed or electrostatic spray, comprising a mixture of a polyester material selected from poly(neopentyl terephthalate), certain alkylene copolymers of isophthalic and terephthalic acid, and aliphatic diacid modifications of these copolymers, blended with a wide weight percentage range of cellulose acetate butyrate or cellulose acetate propionate. Fused coatings of these materials have a reduced gloss and controllable texture.